United States Patent
Hayashi

(10) Patent No.: US 8,832,482 B2
(45) Date of Patent: Sep. 9, 2014

(54) IMAGE FORMING APPARATUS FOR FORMING IMAGE ON SHEET

(75) Inventor: Katsumoto Hayashi, Osaka (JP)

(73) Assignee: Kyocera Document Solutions Inc. (JP)

( * ) Notice: Subject to any disclaimer, the term of this patent is extended or adjusted under 35 U.S.C. 154(b) by 260 days.

(21) Appl. No.: 13/555,298

(22) Filed: Jul. 23, 2012

(65) Prior Publication Data

US 2013/0031394 A1 Jan. 31, 2013

(30) Foreign Application Priority Data

Jul. 25, 2011 (JP) ................................. 2011-161792
Jun. 19, 2012 (JP) ................................. 2012-137572

(51) Int. Cl.
G06F 1/00 (2006.01)
G06F 1/32 (2006.01)
G06F 3/12 (2006.01)
H04N 1/00 (2006.01)
G06F 13/42 (2006.01)

(52) U.S. Cl.
CPC ............ *G06F 1/3209* (2013.01); *G06F 1/3287* (2013.01); *Y02B 60/32* (2013.01); *Y02B 60/1267* (2013.01); *G06F 1/3284* (2013.01)
USPC .......... 713/323; 713/320; 358/1.15; 358/434; 710/105

(58) Field of Classification Search
CPC .... G06F 1/3209; G06F 1/3284; G06F 1/3287
USPC ........... 713/320, 323; 710/105; 358/1.15, 434
See application file for complete search history.

(56) References Cited

U.S. PATENT DOCUMENTS

| 2011/0019225 A1* | 1/2011 | Jung ............................. 358/1.15 |
| 2012/0011384 A1* | 1/2012 | Lee ................................ 713/323 |
| 2012/0017101 A1* | 1/2012 | So et al. ........................ 713/300 |

FOREIGN PATENT DOCUMENTS

JP  2003-228444  8/2003

* cited by examiner

*Primary Examiner* — Stefan Stoynov
(74) *Attorney, Agent, or Firm* — Gerald E. Hespos; Michael J. Porco; Matthew T. Hespos

(57) ABSTRACT

The power supply unit supplies operating power for operating the image forming unit and the first communication interface. The setting control unit stores continuation setting information in the storage unit when a setting condition set in advance is satisfied. The power control unit causes the power supply unit to continue to supply operating power to the first communication interface if the continuation setting information is stored in the storage unit in a sleep mode and causes the power supply unit to stop the supply of the operating power to the first communication interface unless the continuation setting information is stored in the storage unit in the sleep mode. The switching control unit causes the power control unit to perform a normal mode when the first communication interface obtains first communication-related information in the sleep mode.

11 Claims, 7 Drawing Sheets

CASE WHERE USB I/F CAN OPERATE

CASE WHERE USB I/F CANNOT OPERATE

IMAGE FORMING APPARATUS FOR FORMING IMAGE ON SHEET

INCORPORATION BY REFERENCE

This application is based on Japanese Patent Application Serial No. 2011-161792 filed with the Japan Patent Office on Jul. 25, 2011, and Japanese Patent Application Serial No. 2012-137572 filed with the Japan Patent Office on Jun. 19, 2012 the contents of which are hereby incorporated by reference.

BACKGROUND

The present disclosure relates to an image forming apparatus for forming an image on a sheet.

A network-compatible image forming apparatus such as a complex machine, a copier or a printer is provided with a network interface for performing communication with a communication device such as a personal computer through a communication network.

Some of image forming apparatuses of this type are further provided with a USB (Universal Serial Bus) interface for performing communication with a communication device in accordance with USB standards.

Such an image forming apparatus has a sleep mode in which power consumption of the image forming apparatus is suppressed. The image forming apparatus preferably supplies operating power to the network interface and the USB interface in the sleep mode for user convenience. When either one of the network interface and the USB interface receives a print job, it is preferable to perform image formation after a transition is made to a normal mode in which the power consumption of the image forming apparatus is not suppressed.

However, since the USB interface more frequently performs communication with the communication device than the network interface, e.g. Ethernet (registered trademark), it consumes more power than the network interface. Specifically, a system of the USB interface performs a process such as connection confirmation of the communication device by automatically and regularly performing communication with the communication device as a connection destination. Thus, even if the USB interface does not perform communication to execute a user's request, e.g. transmission and reception of print data, the system automatically performs communication. As a result, the power consumption of the USB interface is larger than that of the network interface.

Generally, the network interface is more frequently used by a user than the USB interface. Thus, there is a higher necessity to set the network interface in an operative state than to set the USB interface. Further, it is stipulated to supply operating power to the network interface when in the sleep mode by a TEC (Typical Electricity Consumption) measurement method of ENERGY STAR (registered trademark) which is standards for power saving recommended by the US Environment Protection Agency (EPA).

Thus, there is known an image forming apparatus which supplies operating power to a network interface while stopping the supply of operating power to a USB interface when in a sleep mode.

Unless the operating power is supplied to the USB interface when in the sleep mode, the USB interface cannot receive a print job since being set in a stopped state. Thus, even if a user tries to cause the image forming apparatus to perform the print job using a communication device connected to the USB interface during the sleep mode, the image forming apparatus cannot be transitioned to a normal mode in which a printing operation can be performed.

The image forming apparatus cannot return to the normal mode and perform image formation under such a circumstance, which is inconvenient for a user who wants to let the image forming apparatus perform image formation using the communication device connected to the USB interface.

If the operating power is supplied to both the network interface and the USB interface when in the sleep mode, user convenience is improved, but there is a problem in terms of suppressing power consumption since the USB interface has high power consumption.

To solve the above problem, an object of the present disclosure is to provide an image forming apparatus capable of reducing power consumption while maintaining user convenience.

SUMMARY

An image forming apparatus according to one aspect of the present disclosure is an image forming apparatus to which a communication device is connectable, and comprises an image forming unit, a power control unit, a first communication interface, a power supply unit, a storage unit, a setting control unit and a switching control unit. The image forming unit performs image formation. The power control unit controls power supplied to the image forming unit. The power control unit has a sleep mode in which power consumption is suppressed and a normal mode in which power consumption is not suppressed. The first communication interface performs communication with a communication device and obtains first communication-related information on the communication. The power supply unit supplies operating power for operating the image forming unit and the first communication interface. The setting control unit stores continuation setting information in the storage unit when a setting condition set in advance is satisfied. The switching control unit performs a control to switch the power control unit between the normal mode and the sleep mode. The power control unit causes the power supply unit to supply operating power to the first communication interface in the normal mode, causes the power supply unit to continue to supply the operating power to the first communication interface if the continuation setting information is stored in the storage unit in the sleep mode, and causes the power supply unit to stop the supply of the operating power to the first communication interface unless the continuation setting information is stored in the storage unit in the sleep mode. The switching control unit causes the power control unit to perform the normal mode when the first communication interface to which the operating power is supplied by the power supply unit obtains the first communication-related information in the sleep mode.

These and other objects, features and advantages of the present disclosure will become more apparent upon reading the following detailed description along with the accompanying drawings.

DETAILED DESCRIPTION

Figure 1:
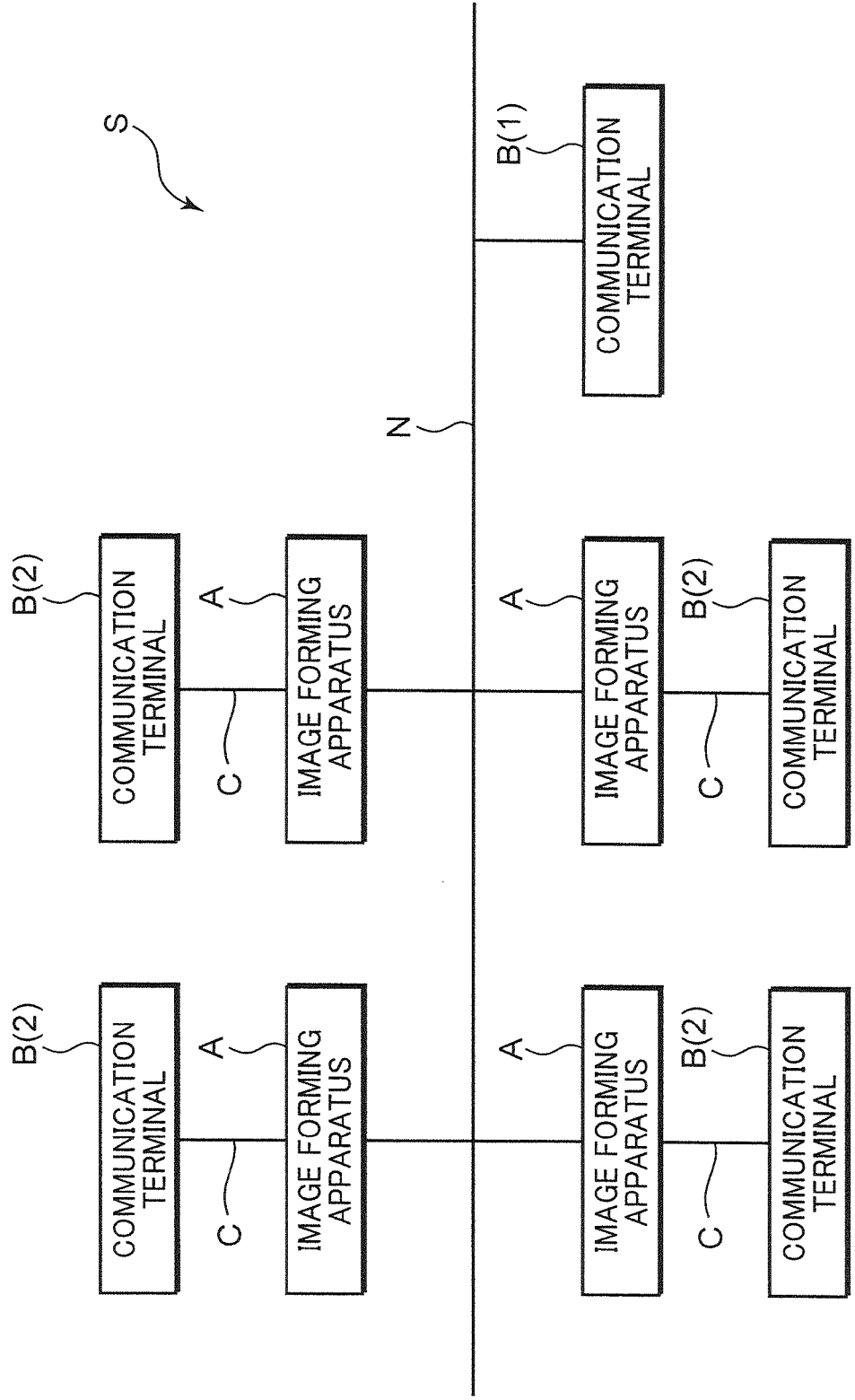
FIG. 1 is a block diagram showing an example of an image forming system including an image forming apparatus according to one embodiment of the present disclosure.

Hereinafter, an embodiment of the present disclosure is described in detail based on the drawings. FIG. 1 is a block diagram showing an example of an image forming system S configured using an image forming apparatus A according to an embodiment of the present disclosure.

The image forming system S includes, for example, a plurality of image forming apparatuses A, a communication terminal B(1) and a plurality of communication terminals B(2) as communication devices.

The image forming apparatuses A are network-compatible printers, copiers, facsimile machines or the like. The communication terminal B(1) is a network-compatible personal computer or the like. The image forming apparatuses A and the communication terminal B(1) are connected to a communication network N such as a LAN (Local Area Network).

The communication terminals B(2) are USB-compatible personal computers or the like. Each communication terminal B(2) is connected to the corresponding image forming apparatus A via a USB cable C in accordance with USB standards.

The image forming apparatus A forms an image on a sheet, for example, based on image data of a document scanned thereby. Further, the image forming apparatus A transmits, for example, scanned image data to the communication terminal B(1) via the communication network N or to the communication terminal B(2) via the USB cable C. Further, the image forming apparatus A receives an image formation request transmitted from the communication terminal B(1) via the communication network N. Further, the image forming apparatus A receives an image formation request transmitted from the communication terminal B(2) via the USB cable C. Then, the image forming apparatus A forms an image on a sheet in accordance with the received image formation request.

The communication terminal B(1) requests image formation of image data by transmitting the image data to any one of the plurality of image forming apparatuses A via the communication network N. The communication terminal B(2) requests image formation of image data by transmitting the image data to the image forming apparatus A connected thereto via the USB cable C.

Figure 2:
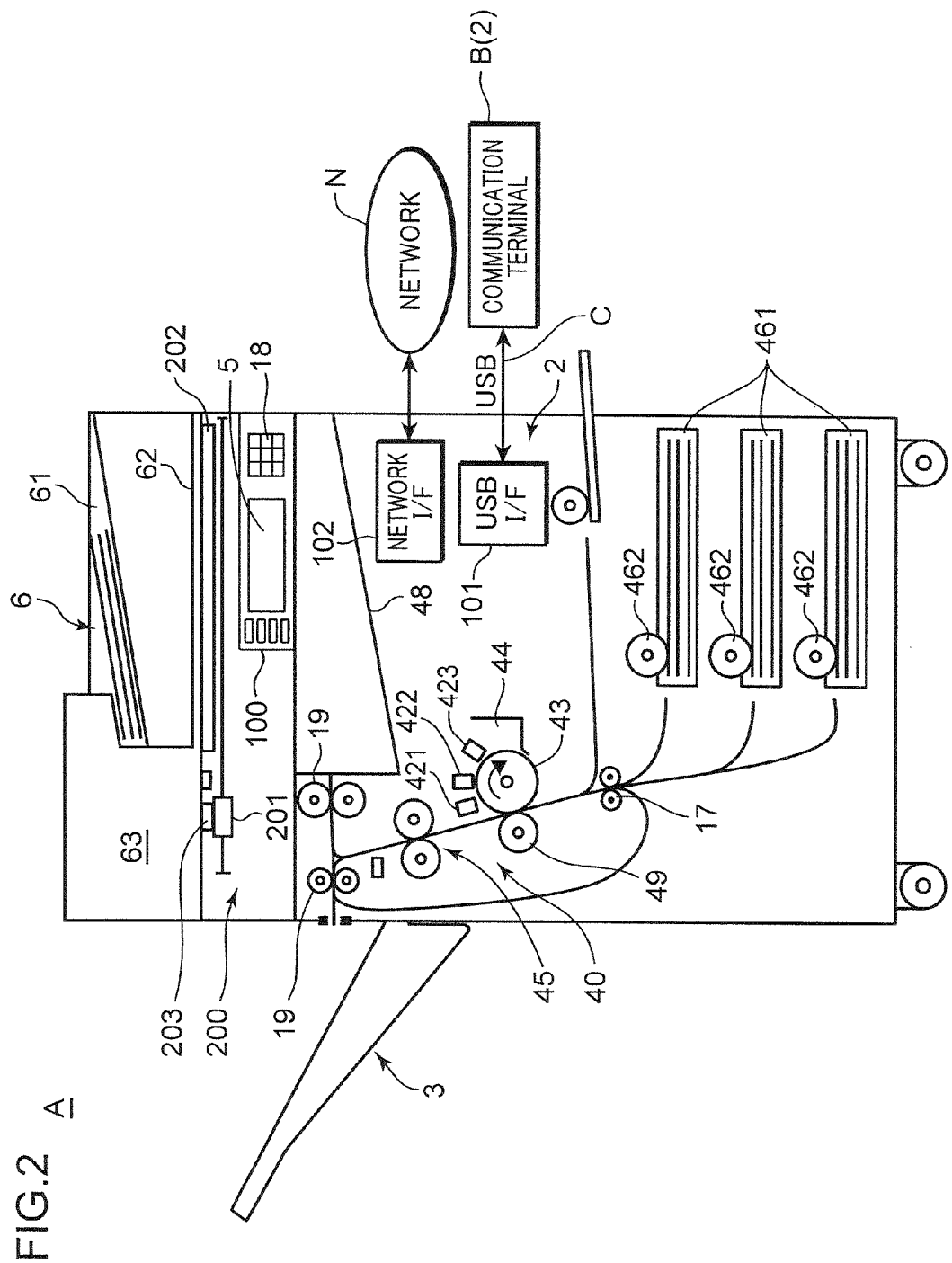
FIG. 2 is a vertical sectional view diagrammatically showing an example of the configuration of the image forming apparatus according to the one embodiment of the present disclosure.

FIG. 2 is a vertical sectional view diagrammatically showing an example of the configuration of the image forming apparatus A according to one embodiment of the present disclosure.

The image forming apparatus A includes a USB interface (I/F) 101 (first communication interface) and a network interface (I/F) 102 (second communication interface). The USB interface 101 is an interface circuit for performing communication with the communication terminal B(2) via the USB cable C.

The USB interface 101 performs mutual communication in accordance with the USB (Universal Serial Bus) standards with the communication terminal B(2) through a data line of the USB cable C when the USB interface 101 and the communication terminal B(2) are connected.

The USB interface 101 detects connection of the communication terminal B(2) via the USB cable C. Specifically, the USB interface 101 detects connection of the communication terminal B(2) as follows.

The USB cable C includes a power supply line through which the communication terminal B(2) supplies a predetermined source voltage (e.g. 5 V). Thus, when the communication terminal B(2) is connected to the USB interface 101 via the USB cable C, the source voltage is applied from the communication terminal B(2) to the USB interface 101. Accordingly, the USB interface 101 obtains a signal indicating application of the source voltage from the USB cable C as information indicating the connection of the communication terminal B(2) to the USB interface 101. The information indicating the connection of the communication terminal B(2) to the USB interface 101 corresponds to an example of first communication-related information.

The USB interface 101 transmits a connection detection signal to a main controller 103 to be described later when obtaining the information indicating the connection of the communication terminal B(2) to the USB interface 101, i.e. when detecting the connection of the communication terminal B(2) to the USB interface 101.

Further, when the USB interface 101 and the communication terminal B(2) are connected, the USB interface 101 performs communication for negotiation through the data line of the USB cable C with the communication terminal B(2).

Further, when communication information which is information on communication is transmitted from the communication terminal B(2) through the data line, the USB interface 101 receives this information. Then, the USB interface 101 transmits the received communication information to the main controller 103 to be described later. Note that the communication information may be, for example, information indicating a print job request or the above information for negotiation. The communication information corresponds to an example of the first communication-related information.

The USB interface 101 frequently (e.g. every 125 µsec) performs communication with the communication terminal B(2), for example, for connection confirmation of the communication terminal B(2).

The network interface 102 is a network circuit for performing communication with the communication terminal B(1) and the other image forming apparatuses A via the communication network N. For example, an Ethernet (registered trademark) communication network circuit is used as the network interface. When communication information which is information on communication is transmitted from the communication terminal B(1) via the communication network N, the network interface 102 receives this. Note that the communication information may be, for example, information indicating a print job request. The communication information received by the network interface 102 corresponds to an example of second communication-related information.

This network interface 102 has lower power consumption than the USB interface 101.

The image forming apparatus A includes a main body housing 2, a stack tray 3 arranged to the left of the main body housing 2, a document reading unit 200 arranged atop the main body housing 2 and a document feeding unit 6 arranged atop the document reading unit 200. Further, a substantially rectangular user interface unit 100 is provided on a front part of the image forming apparatus A.

The document reading unit 200 includes a scanner unit 201 with a CCD (Charge Coupled Device), an exposure lamp and the like, a document platen 202 formed of a transparent member such as glass, and a document reading slit 203. The scanner unit 201 is configured to be movable by an unillustrated driver and moved along a document surface at a position facing the document platen 202 to scan a document image when reading a document placed on the document platen 202.

The scanning unit 201 is moved to a position facing the document reading slit 203 and obtains an image of a document in synchronization with a document conveying operation by the document feeding unit 6 through the document reading slit 203 when reading a document fed by the document feeding unit 6.

The document feeding unit 6 includes a document placing portion 61 on which a document is to be placed, a document discharging portion 62 onto which a document having an image already read is to be discharged and a document conveying mechanism 63. The document conveying mechanism 63 includes a feed roller (not shown), conveyor rollers (not shown) and the like. The feed roller (not shown) and the conveyor rollers (not shown) feed documents placed on the document placing portion 61 one by one, convey them to the position facing the document reading slit 203 and discharge them to the document discharging portion 62. The document conveying mechanism 63 further includes a sheet reversing mechanism (not shown) for turning a document upside down and conveying it again to the position facing the document reading slit 203, so that images of both sides of the document can be read through the document reading slit 203 by the scanning unit 201.

Further, the document feeding unit 6 is provided rotatably relative to the main body housing 2 so that a front side thereof can be moved upwardly. By moving the front side of the document feeding unit 6 upwardly to expose the upper surface of the document platen 202, the user can place a document to be read, e.g. an opened book on the upper surface of the document platen 202.

The main body housing 2 includes a plurality of sheet cassettes 461, pickup rollers 462 for picking up a sheet from the sheet cassette 461 and conveying it to an image forming unit 40, the image forming unit 40 for forming an image on a sheet conveyed from the sheet cassette 461, and a pair of registration rollers 17 for feeding a sheet from the sheet cassette 461 at a predetermined timing for image transfer to the sheet by a transfer roller 49 and a photoconductive drum 43.

Sheets of different sizes are stored in the respective sheet cassettes 461. For example, sheets of A4 size are stored in the sheet cassette 461 in an upper level, sheets of B5 size are stored in the sheet cassette 461 in a middle level and sheets of A3 size are stored in the sheet cassette 461 in a lower level.

The image forming unit 40 includes the photoconductive drum 43, a charge removing device 421, a charging device 422, an exposure device 423, a developing device 44, the transfer roller 49, a fixing device 45 and conveyor rollers 19. The charge removing device 421 removes charges on a surface of the photoconductive drum 43. The charging device 422 charges the surface of the photoconductive drum 43. The exposure device 423 outputs laser light or the like to expose the photoconductive drum 43 to light based on image data obtained by the scanning unit 201 or image data received via the communication network N or the USB cable C. The developing device 44 supplies toner to the surface of the photoconductive drum 43. The transfer roller 49 transfers a toner image on the photoconductive drum 43 to a sheet.

The fixing device 45 includes, for example, a heater. The fixing device 45 heats a sheet having a toner image transferred thereto and fixes the toner image to the sheet. The conveyor rollers 19 convey the sheet to the stack tray 3 or an internal sheet discharging portion 48.

The user interface unit 100 includes a display unit 5 and an operation unit 18. The operation unit 18 is configured, for example, so that the other image forming apparatus A desired to perform image formation from image data obtained by scanning in the own apparatus can be selected. The operation unit 18 receives an instruction operation to cause the image forming apparatus A selected by the user to perform image formation. Images (e.g. guidance images) for the instruction operation are displayed on the display unit 5. The user interface unit 100 receives an instruction to cause the selected image forming apparatus A to perform image formation when the operation unit 18 receives the instruction operation.

Figure 3:
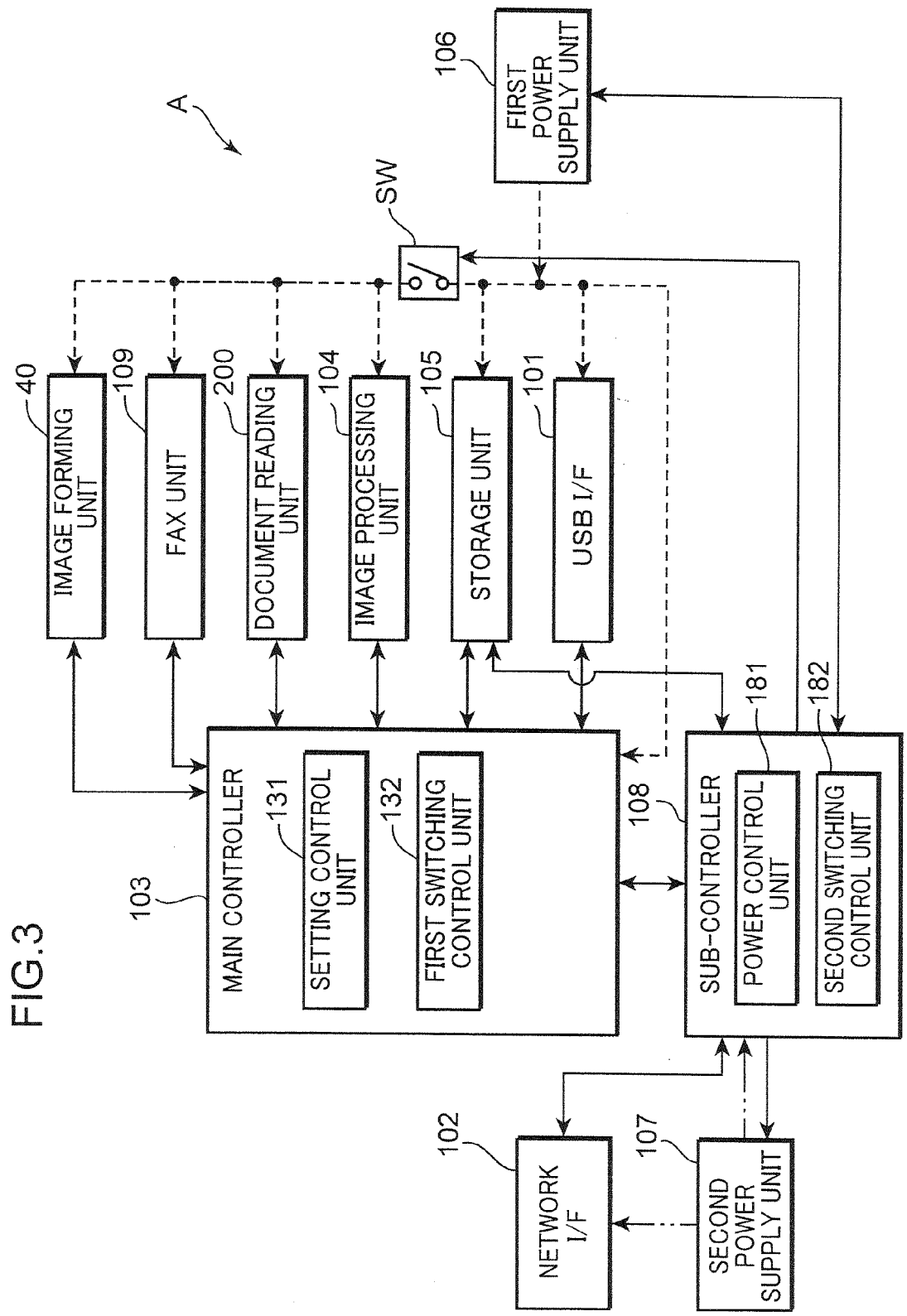
FIG. 3 is a block diagram showing an example of an essential part of the electrical configuration in the image forming apparatus shown in FIG. 2.

FIG. 3 is a block diagram showing an essential part of an example of the electrical configuration of the image forming apparatus A.

The image forming apparatus A includes the image forming apparatus 40, the USB interface (I/F) 101, the network interface (I/F) 102, the main controller 103, an image processing unit 104, the document reading unit 200, a storage unit 105, a first power supply unit 106, a second power supply unit 107, a sub-controller 108, a FAX unit 109 and a switch SW on-off controlled by the sub-controller 108. Note that the image forming apparatus 40, the USB interface 101, the network interface 102 and the document reading unit 200 are not described since they are as described above.

The main controller 103 is a device for centrally controlling the image forming apparatus A such as for the operation of the image forming unit 40 and sheet conveyance. The main controller 103 is composed of a CPU (Central Processing Unit), a RAM (Random Access Memory), a ROM (Read Only Memory) and a clock output unit for outputting an operation clock of the CPU. For example, the CPU executes a predetermined control program to configure a setting control unit 131 and a first switching control unit 132.

The main controller 103 operates on operating power supplied from the first power supply unit 106. Then, the main controller 103 controls the image forming apparatus A, the image forming unit 40, the USB interface 101, the image processing unit 104, the storage unit 105, the FAX unit 109, the sub-controller 108 and the document reading unit 200. The main controller 103, for example, causes the document reading unit 200 to read image data of a document. Then, the main controller 103 causes the image forming unit 40 to form an image on a sheet based on that image data.

Further, the main controller 103 causes the sub-controller 108 to transmit this image data to the communication network N, for example, when the user interface unit 100 receives an instruction to cause the other image forming apparatus A selected by the user to perform image formation. In this way, the main controller 103 instructs the other image forming apparatus A selected by the user to perform image formation.

The setting control unit 131 receives continuation setting when receiving a connection detection signal described above from the USB interface 101, i.e. when the USB interface 101 detects connection of the communication terminal B(2). Then, the setting control unit 131 stores continuation setting information, which is information indicating continuation setting, in the storage unit 105. The continuation setting is setting to continue the supply of the operating power to the USB interface 101 by the first power supply unit 106 in a sleep mode.

The detection of the connection of the communication terminal B(2) to the USB interface 101 by the USB interface 101 corresponds to an example of a setting condition.

Note that since the USB interface 101 performs the above negotiation immediately after the USB interface 101 and the communication terminal B(2) are connected, the setting control unit 131 can quickly judge the connection of the communication terminal B(2) to the USB interface 101 also when the USB interface 101 receives the communication information for negotiation from the communication terminal B(2).

Accordingly, the setting control unit 131 may store predetermined continuation setting information in the storage unit 105 when the USB interface 101 receives the communication information from the communication terminal B(2). In this case, the reception of the communication information from the communication terminal B(2) by the USB interface 101 corresponds to an example of the setting condition.

The first switching control unit 132 executes a control to switch between a normal mode and the sleep mode of a power control unit 181 to be described later.

The image processing unit 104 processes image data of a document read by the document reading unit 200. The storage unit 105 is, for example, a volatile storage device such as a SRAM (Static Random Access Memory) or a DRAM (Dynamic Random Access Memory).

The first and second power supply units 106, 107 configure a power supply unit in this disclosure. The first and second power supply units 106, 107 are, for example, power supply circuits such as switching power supply circuits. The first power supply unit 106 supplies the operating power for operating the USB interface 101, the main controller 103 and the storage unit 105 to these load circuits. Further, the first power supply unit 106 supplies the operating power for operating the image forming unit 40, the image processing unit 104, the document reading unit 200 and the FAX unit 109 to these load circuits via the switch SW. In FIG. 3, supply paths of the operating power by the first power supply unit 106 are shown by broken line.

Note that the first power supply unit 106 may include a plurality of power supply circuits for generating a voltage required by each load circuit. Further, the first power supply unit 106 needs not necessarily be connected to the image forming unit 40 via the switch SW. For example, the first power supply unit 106 can control to supply and stop supplying power to each element included in the image forming unit 40. Alternatively, the first power supply unit 106 may be capable of adjusting power supplied to a part of the image forming unit 40, e.g. the heater of the fixing device 45.

The second power supply unit 107 supplies the operating power for the network interface 102 and the sub-controller 108. In FIG. 3, supply paths of the operating power by the second power supply unit 107 are shown by chain double-dashed line.

The FAX unit 109 is a device for performing facsimile communication with a facsimile machine connected to an unillustrated public network.

The sub-controller 108 is composed of a CPU (Central Processing Unit), a RAM (Random Access Memory), a ROM (Read Only Memory) and a clock output unit for outputting an operation clock of the CPU. For example, the CPU executes a predetermined control program to configure the power control unit 181 and a second switching control unit 182.

The sub-controller 108 operates on the operating power supplied from the second power supply unit 107. Then, the sub-controller 108 controls the network interface 102, the storage unit 105, the first power supply unit 106, the second power supply unit 107 and the switch SW.

The power control unit 181 controls the first power supply unit 106. The power control unit 181 has a sleep mode in which power consumption of the image forming apparatus A is suppressed and a normal mode in which all functions of the image forming apparatus A can be performed without suppressing power consumption of the image forming apparatus A.

Specifically, the power control unit 181 turns on the switch SW in the normal mode. Then, the power control unit 181 causes the first power supply unit 106 to supply the operating power to the main controller 103, the image forming unit 40, the FAX unit 109, the document reading unit 200, the image processing unit 104, the storage unit 105 and the USB interface 101.

Further, if the continuation setting information is stored in the storage unit 105 in the sleep mode, the power control unit 181 turns off the switch SW to stop power supply to the image forming unit 40, the FAX unit 109, the document reading unit 200 and the image processing unit 104 while causing the first power supply unit 106 to continue the supply of the operating power to the USB interface 101, the main controller 103 and the storage unit 105.

Further, unless the continuation setting information is stored in the storage unit 105 in the sleep mode, the power control unit 181 stops (turns off) the power supply unit 106 to stop the supply of the operating power to the main controller 103, the image forming unit 40, the FAX unit 109, the document reading unit 200, the image processing unit 104, the storage unit 105 and the USB interface 101.

Note that the image forming unit 40 may be directly connected to the first power supply unit 106 without via the switch SW, and the power control unit 181 may reduce, for example, power supply to the fixing device 45 of the image forming unit 40 by the first power supply unit 106 instead of stopping power supply to the image forming unit 40.

Further, the second switching control unit 182 switches the power control unit 181 to the normal mode when communication information, e.g. a print job is received by the network interface 102 in the sleep mode.

Hereinafter, a factor causing a switch of the power control unit 181 from the sleep mode to the normal mode is referred to as a return factor. Reception of communication information such as a print job by the network interface 102 is an example of the return factor.

Figure 4:
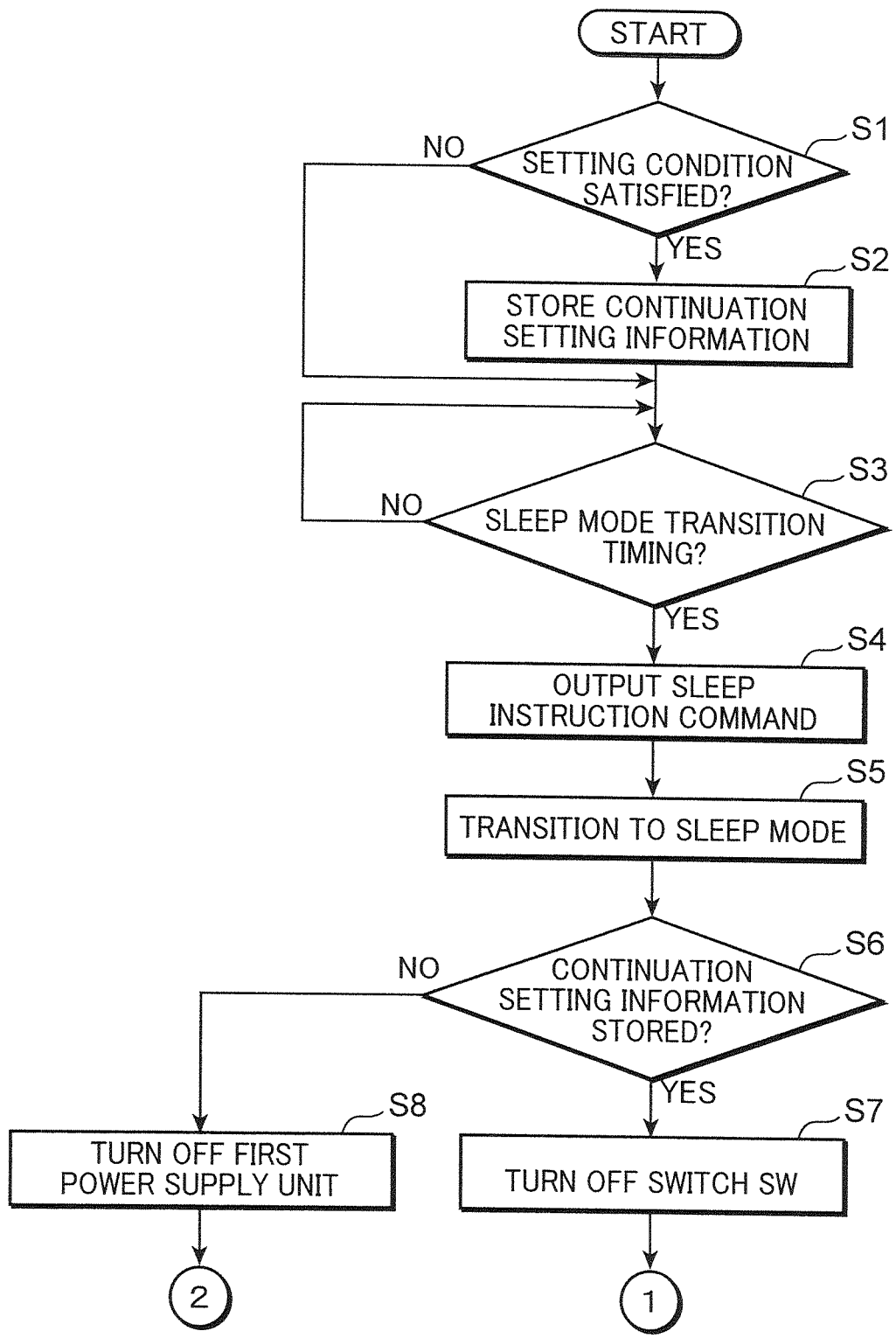
FIG. 4 is a flow chart showing an example of a summary of a transition operation of the image forming apparatus shown in FIG. 2 from a normal mode to a sleep mode.

A summary of the operation of the image forming apparatus A configured as described above is described blow. First, a transition operation from the normal mode to the sleep mode is described. FIG. 4 is a flow chart showing an example of a summary of the transition operation of the image forming apparatus A from the normal mode to the sleep mode.

The power control unit 181 turns on the first power supply unit 106, the switch SW and the second power supply unit 107 in the normal mode, whereby the operating power is supplied to all the elements shown in FIG. 3. Then, it is confirmed by the setting control unit 131 whether or not the USB interface 101 has detected the connection of the communication terminal B(2), i.e. the setting condition has been satisfied (Step S1).

Unless the setting condition is satisfied (NO in Step S1), the setting control unit 131 proceeds to Step S3. On the other hand, if the setting condition is satisfied (YES in Step S1), the setting control unit 131 causes the storage unit 105 to store the continuation setting information (Step S2) and proceeds to Step S3.

Specifically, since the operating power is supplied to the main controller 103, the USB interface 101 and the storage unit 105 when the power control unit 181 is in the normal mode, the setting control unit 131 can cause the storage unit 105 to store the continuation setting information when the USB interface 101 detects the above connection.

Note that the setting condition may be that the operation unit 18 receives an operation of requesting the above continuation setting.

Further, the setting condition may be that the USB interface 101 receives a continuation setting command requesting the above continuation setting from the communication terminal B(2) via the USB cable C.

Alternatively, the setting condition may be that the network interface 102 receives the continuation setting command requesting the above continuation setting from the communication terminal B(1) via the communication network N.

There are many cases where a user using the network interface 102 does not use the USB interface 101 at all. On the other hand, there is a high possibility that a user using the USB interface 101 repeatedly uses the USB interface 101.

Accordingly, once the communication terminal B(2) is connected to the USB interface 101, it indicates a high possibility of using the USB interface 101 again.

Further, when a user performs an operation of requesting the above continuation setting using the operation unit 18 or when the continuation setting command is received by the USB interface 101 or the network interface 102, it is thought to indicate the user's explicit intention to use the USB interface 101. Thus, there is a high possibility of using the USB interface 101 again.

Such a condition based on which a high possibility of using the USB interface 101 again can be judged is set as the setting condition in advance.

If the detection of the connection of the communication terminal B(2) by the USB interface 101 is the setting condition, the user can store the continuation setting information in the storage unit 105 only by connecting the communication device to the USB interface 101. Thus, the user needs not perform an operation of instructing the storage of the continuation setting information in the storage unit 105, wherefore user convenience is improved.

Further, if the detection of communication information such as information indicating a request of a print job by the USB interface 101 is the setting condition, the user can store the continuation setting information in the storage unit 105 by causing the communication device to transmit, for example, a print job as communication information on communication to the USB interface 101. Thus, the user needs not perform an operation of instructing the storage of the continuation setting information in the storage unit 105, wherefore user convenience is improved.

When a transition timing to the sleep mode is reached (YES in Step S3), the first switching control unit 132 of the main controller 103 outputs a sleep instruction command instructing a transition to the sleep mode to the power control unit 181 of the sub-controller 108 (Step S4).

A transition condition to the sleep mode may be, for example, that neither the FAX unit 109 nor the network interface 102 has received a print job, and the USB interface 101 has not received the connection of the communication terminal B(2) to the USB interface 101 or the transmission of a print job, and the operation unit 18 has not be operated for a predetermined time.

The power control unit 181 transitions to the sleep mode (Step S5) when receiving the sleep instruction command.

The power control unit 181 operates as follows after transitioning to the sleep mode. That is, the power control unit 181 determines by referring to the storage unit 105 whether or not the continuation setting information is stored in the storage unit 105 (Step S6). If the continuation setting information is stored (YES in Step S6), the power control unit 181 turns off the switch SW (Step S7). On the other hand, unless the continuation setting information is stored (NO in Step S6), the power control unit 181 turns off the first power supply unit 106 (Step S8).

As described above, when the power control unit 181 transitions to the sleep mode after the setting control unit 131 receives the continuation setting, the switch SW is turned off with the first power supply unit 106 kept on. Although the supply of the operating power to the image forming unit 40, the FAX unit 109, the document reading unit 200 and the image processing unit 104 is cut off in this way, the supply of the operating power to the USB interface 101 and the network interface 102 is continued.

Thus, power consumption is suppressed more in the sleep mode than in the normal mode. Further, since the operating power is supplied to the USB interface 101 and the network interface 102 also in the sleep mode, the USB interface 101 and the network interface 102 are set to be operable in the sleep mode. As a result, the USB interface 101 and the network interface 102 can, in the sleep mode, detect the return factor for the return of the power control unit 181 to the normal mode, wherefore power consumption can be reduced while user convenience is improved.

Further, if the setting condition is not satisfied, i.e. if there is a low possibility that the user uses the USB interface 101 again, the continuation setting information is not stored in the storage unit 105. If the continuation setting information is not stored in the storage unit 105, the first power supply unit 106 is turned off when the power control unit 181 transitions to the sleep mode. In this way, the supply of the operating power to the elements of the image forming apparatus A other than the network interface 102 and the sub-controller 108 is cut off. As a result, power consumption can be suppressed more when there is a low possibility that the user uses the USB interface 101 again than when there is a high possibility that the user uses the USB interface 101 again.

According to processings in Step S6, S8, the supply of the operating power to the USB interface 101 having higher power consumption than the network interface 102 is stopped when the power control unit 181 is in the sleep mode, wherefore power consumption can be preferably suppressed.

Furthermore, since the operating power is supplied from the first power supply unit 106 to the storage unit 105 in the sleep mode if the continuation setting information is stored in the storage unit 105, the continuation setting information stored in the storage unit 105 is not erased even if a transition is made to the sleep mode. Thus, once the continuation setting information is stored in the storage unit 105, the USB interface 101 is set to be operable in the sleep mode no matter how many times a transition is made to the sleep mode. Thus, the user only has to connect the communication terminal B(2) to the image forming apparatus A even once when the image forming apparatus A is in the normal mode if he wishes to cause the USB interface 101 to operate in the sleep mode. In this way, user convenience is improved.

Note that although the continuation setting information is stored in the storage unit 105 in this embodiment, it may be stored in the RAM (not shown) of the main controller 103. In this case, since the power control unit 181 can judge the presence or absence of the continuation setting information in the RAM by accessing to the RAM, effects similar to those in the case of storing the continuation setting information in the storage unit 105 can be achieved.

Even in this case, it can be judged that the continuation setting information is stored in the RAM no matter how many times a transition is made to the sleep mode as long as the continuation setting information is stored in the RAM. Thus, the USB interface 101 can be operated in the sleep mode and the above effects can be obtained.

Figure 5:
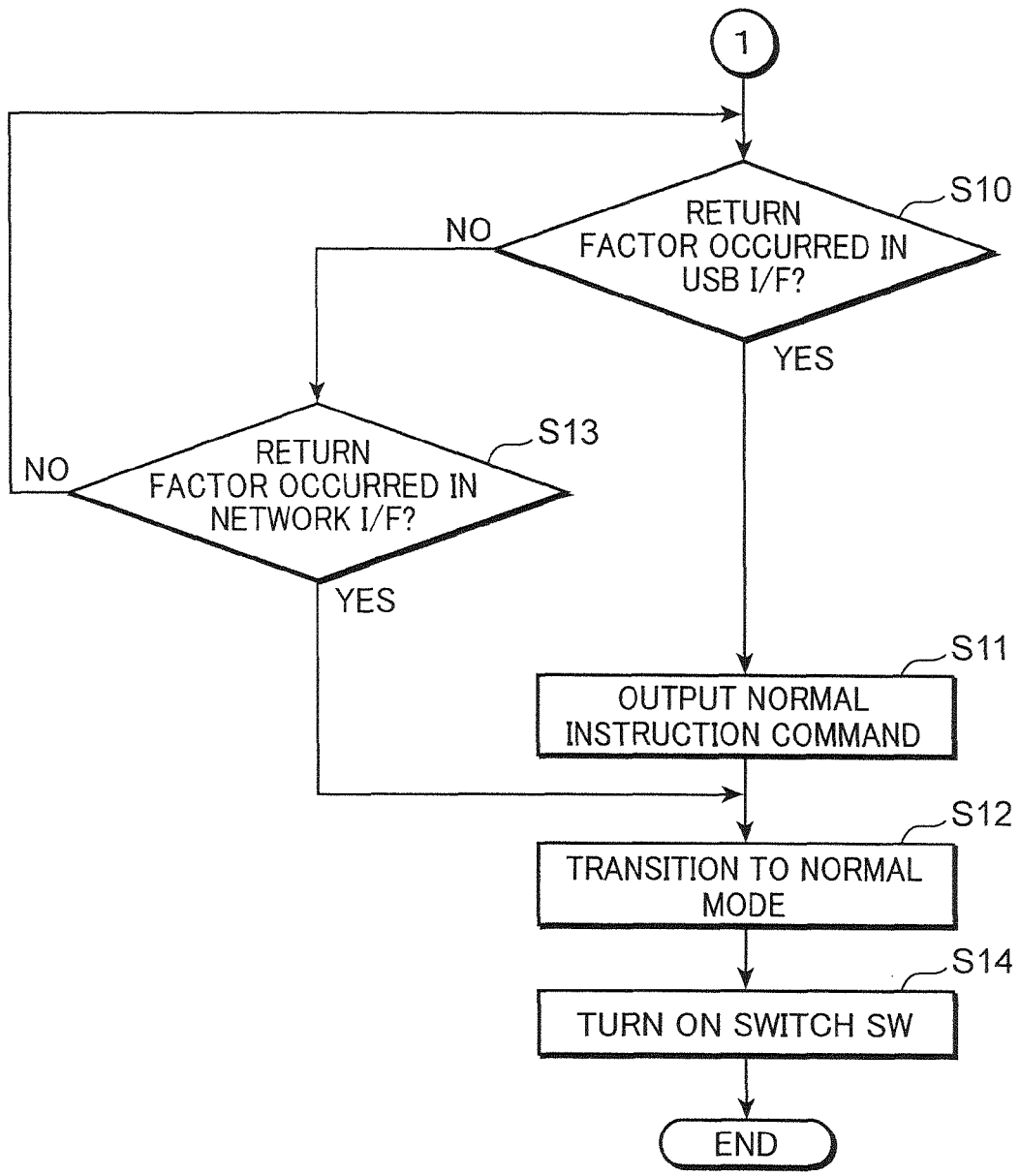
FIG. 5 is a flow chart showing an example of a summary of a return operation to the normal mode after a switch is turned off in the sleep mode.

Next, a return operation to the normal mode after the switch SW is turned off in Step S7 of FIG. 4 is described. FIG. 5 is a flow chart showing an example of a summary of the return operation to the normal mode after the switch SW is turned off in the sleep mode.

When the USB interface 101 detects the connection of the communication terminal B(2) or when the USB interface 101 receives a print job from the communication terminal B(2), the first switching control unit 132 judges that a return factor has been detected. The detection of the connection of the communication terminal B(2) by the USB interface 101 and the reception of a print job from the communication terminal B(2) by the USB interface 101 are examples of the return factor.

When a return factor occurs in the USB interface 101 (YES in Step S10), the first switching control unit 132 outputs a normal instruction command instructing a switch to the normal mode to the power control unit 181 (Step S11). Then, the power control unit 181 transitions to the normal mode (Step S12).

If the detection of the connection of the communication terminal B(2) by the USB interface 101 is the return factor, the user can return the power control unit 181 to the normal mode only by connecting the communication device to the USB interface 101, wherefore user convenience is improved.

Further, if the reception of communication information such as information indicating a print job request by the USB interface 101 is the return factor, the user can return the power control unit 181 to the normal mode and cause the image forming apparatus A to perform image formation by causing the communication device to transmit, for example, a print job as communication information on communication to the USB interface 101, wherefore convenience is improved.

Alternatively, when a return factor occurs in the network interface 102, e.g. when the network interface 102 receives a print job (NO in Step S10, YES in Step S13), the second switching control unit 182 causes the power control unit 181 to transition to the normal mode (Step S12).

In the normal mode, the power control unit 181 turns on the switch SW (Step S14). In this way, the supply of the operating power to the image forming unit 40, the FAX unit 109, the document reading unit 200 and the image processing unit 104 is resumed in the normal mode. Then, the main controller 103 performs the above print job and forms image(s) based on image data.

If the reception of communication information such as a print job request by the network interface 102 is the return factor, the user can return the power control unit 181 to the normal mode and cause the image forming apparatus A to perform image formation by causing the communication device to transmit, for example, a print job as communication information to the network interface 102, wherefore convenience is improved.

Figure 6:
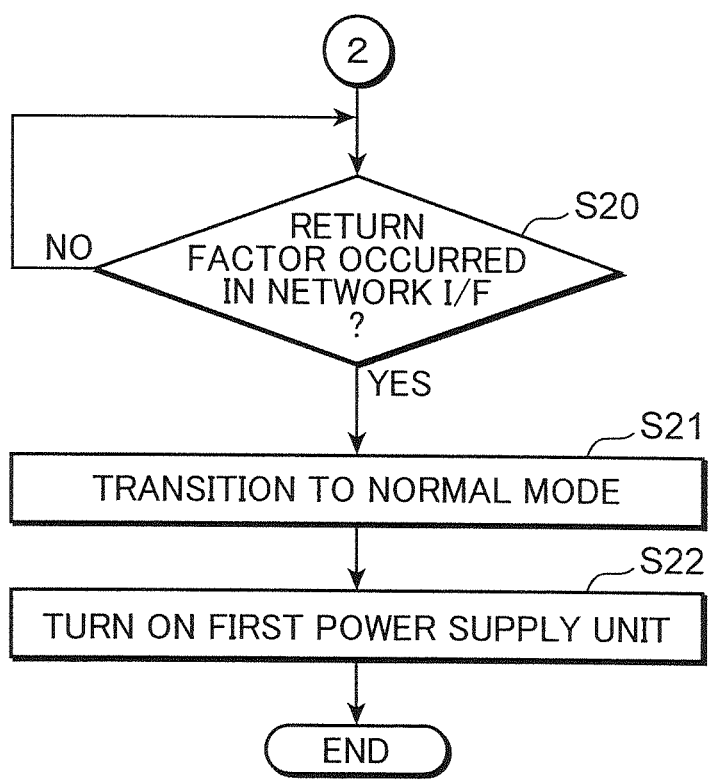
FIG. 6 is a flow chart showing an example of a summary of a return operation to the normal mode after a first power supply unit is turned off in the sleep mode.

Next, a return operation to the normal mode after the first power supply unit 106 is turned off in Step S8 of FIG. 4 is described. FIG. 6 is a flow chart showing an example of a summary of the return operation to the normal mode after the first power supply unit 106 is turned off in the sleep mode.

When a return factor occurs in the network interface 102, e.g. the network interface 102 receives a print job (YES in Step S20), the second switching control unit 182 causes the power control unit 181 to transition to the normal mode (Step S21).

The power control unit 181 turns on the first power supply unit 106 in the normal mode (Step S22). This enables the image forming apparatus A to perform image formation in the normal mode. Then, the main controller 103 performs the above print job and forms image(s) based on image data.

Note that the FAX unit 109 or an option board such as a wireless LAN board may be arranged as a first communication interface instead of the USB interface 101. In this case, a return to the normal mode upon the occurrence of a return factor in the network interface 102 is defaulted, whereas a return to the normal mode upon the occurrence of a return factor in the option board can be set according to the user's request.

Figure 7A:
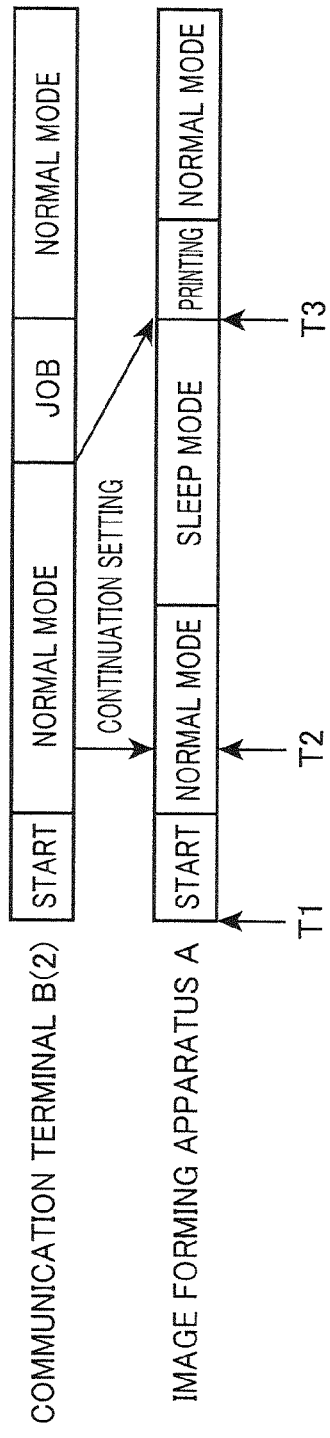
FIG. 7A is a diagram showing a case where continuation setting is possible when a communication terminal is connected to a USB interface.
Figure 7B:
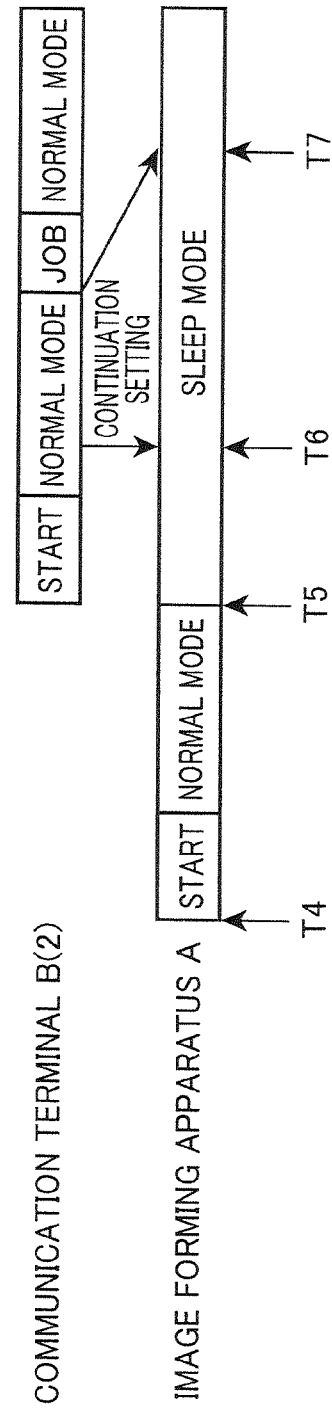
FIG. 7B is a diagram showing a case where continuation setting is not possible when the communication terminal is connected to the USB interface.

Further, the storage unit 105 is preferably composed of a rewritable nonvolatile storage device, e.g. an EEPROM (Electrically Erasable and Programmable Read Only Memory), a FeRAM (Ferroelectric Random Access Memory) or a flash memory. FIGS. 7A and 7B are diagrams showing an advantage when the storage unit 105 is composed of a nonvolatile storage device.

First, the image forming apparatus A and the communication terminal B(2) are powered off while being connected by the cable C. In this state, if the image forming apparatus A and the communication terminal B(2) are powered on and started (timing T1), for example, as shown in FIG. 7A, the image forming apparatus A (power control unit 181) is in the normal mode for a specified period after the start. In this case, since the USB interface 101 is operating, it detects the connection of the communication terminal B(2) by detecting a source voltage supplied from the USB cable C by the start of the communication terminal B(2).

In this way, the setting condition is satisfied (YES in Step S1) and the setting control unit 131 stores the continuation setting information in the storage unit 105 (Step S2, timing T2). As a result, power is supplied to the USB interface 101, the main controller 103 and the storage unit 105 also after the image forming apparatus A (power control unit 181) transitions to the sleep mode (YES in Step S6). Thus, if a print job request is transmitted from the communication terminal B(2) to the USB interface 101, the USB interface 101 detects the return factor (YES in Step S10) and a switch to the normal mode is made by the first switching control unit 132 (Step S11, timing T3). In this way, the image forming apparatus A can return to the normal mode and perform image formation in accordance with the print job request.

Next, a case is described using FIG. 7B where a print job received by the USB interface 101 cannot be performed during the sleep mode when the image forming apparatus A and the communication terminal B(2) are powered off after the above operation shown in FIG. 7A and the storage unit 105 is a volatile storage device. First, when the image forming apparatus A is powered off, the continuation setting information stored in the storage unit 105 is erased.

In this state, the image forming apparatus A is powered on and started at timing T4 shown in FIG. 7B and the image forming apparatus A (power control unit 181) is set to the normal mode. However, if there is no operation or the like of the image forming apparatus A for a predetermined time, the image forming apparatus A (power control unit 181) is switched to the sleep mode by the first switching control unit 132 (timing T5). In this case, since the continuation setting information is not stored in the storage unit 105 (NO in Step S6), the first power supply unit 106 is turned off by the power control unit 181 (Step S8).

When the communication terminal B(2) is powered on and started in this state, the image forming apparatus A (power control unit 181) is already in the sleep mode and the USB interface 101 does not operate. Thus, the USB interface 101 cannot detect the connection of the communication terminal B(2). Therefore, the continuation setting information cannot be stored in the storage unit 105 (timing T6).

Further, if a print job request is transmitted from the communication terminal B(2) to the USB interface 101, the USB interface 101 cannot receive the print job request since being in a stopped state. As a result, the first switching control unit 132 cannot detect the return factor. Thus, the first switching control unit 132 cannot switch the power control unit 181 to the normal mode. Therefore, the image forming apparatus A cannot perform the print job (timing T7).

However, if the storage unit 105 is composed of a nonvolatile storage device, the continuation setting information in the storage unit 105 is not erased even if a power switch is turned off. Thus, when the image forming apparatus A (power control unit 181) is switched to the sleep mode at timing T5, power is supplied to the USB interface 101, the main controller 103 and the storage unit 105 also after the image forming apparatus A (power control unit 181) transitions to the sleep mode since the continuation setting information stored at timing T2 of FIG. 7A is stored in the storage unit 105 (YES in Step S6).

Accordingly, if the storage unit 105 is composed of a nonvolatile storage device, the image forming apparatus A can perform image formation in accordance with the print job request as at timing T3 shown in FIG. 7A when the USB interface 101 receives the print job request from the communication terminal B(2) at timing T7.

Further, if the storage unit 105 is composed of a nonvolatile storage device, the power control unit 181 may stop the supply of the operating power to the storage unit 105 by the first power supply unit 106 in the sleep mode also when the continuation setting information is stored in the storage unit 105. This can reduce power consumption in the sleep mode.

As described above, when a return factor occurs in the USB interface 101 having higher power consumption than the network interface 102, a return is made to the normal mode according to the user's request by the processings of Steps S1 to S22. On the other hand, a return to the normal mode upon the occurrence of a return factor in the network interface 102 having lower power consumption than the USB interface 101 can be defaulted. As a result, power consumption can be reduced while user convenience is improved.

Note that although the switching control unit is composed of the first switching control unit 132 and the second switching control unit 182 in the above example, the sub-controller 108 may be configured to be accessible to the USB interface 101 and include a switching control unit as an integral assembly of the first and second switching control units 132, 182.

Further, although the main controller 103 and the sub-controller 108 are separated in the above example, a controller as an integral assembly of the main controller 103 and the sub-controller 108 may be provided. Even in the sleep mode, the operating power may be supplied to the controller.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus to which a communication device is connectable, comprising:
    an image forming unit for performing image formation;
    a power control unit for controlling power to be supplied to the image forming unit, the power control unit having a sleep mode in which power consumption is suppressed and a normal mode in which power consumption is not suppressed;
    a first communication interface for performing communication with the communication device and obtaining first communication-related information on the communication;
    a power supply unit for supplying operating power for operating the image forming unit and the first communication interface;
    a storage unit;
    a setting control unit for storing continuation setting information in the storage unit when a setting condition set in advance is satisfied; and
    a switching control unit for performing a control to switch between the normal mode and the sleep mode of the power control unit,
    wherein:
    the power control unit causes the power supply unit to supply the operating power to the first communication interface when in the normal mode, causes the power supply unit to continue to supply the operating power to the first communication interface if the continuation setting information is stored in the storage unit in the sleep mode, and causes the power supply unit to stop the supply of the operating power to the first communication interface unless the continuation setting information is stored in the storage unit in the sleep mode; and
    the switching control unit causes the power control unit to perform the normal mode when the first communication interface to which the operating power is supplied by the power supply unit obtains the first communication-related information in the sleep mode.

2. An image forming apparatus according to claim 1, wherein:
    the power supply unit further supplies operating power to the storage unit;
    the storage unit is a volatile storage device which stores information while the operating power is supplied; and
    the power control unit further causes the power supply unit to supply the operating power to the storage unit when in the normal mode, causes the power supply unit to continue to supply the operating power to the storage unit if the continuation setting information is stored in the storage unit in the sleep mode, and causes the power supply unit to stop the supply of the operating power to the storage unit unless the continuation setting information is stored in the storage unit in the sleep mode.

3. An image forming apparatus according to claim 1, wherein:
    the power supply unit further supplies operating power to the storage unit;
    the storage unit is a nonvolatile storage device which maintains the storage of information even if the operating power is not supplied; and
    the power control unit causes the power supply unit to supply the operating power to the storage unit when in the normal mode and causes the power supply unit to stop the supply of the operating power to the storage unit when in the sleep mode.

4. An image forming apparatus according to claim 1, wherein the first communication-related information includes information indicating that the communication device has been connected to the first communication interface.

5. An image forming apparatus according to claim 4, wherein the setting condition is that the first communication interface has obtained the information indicating the connection of the communication device to the first communication interface.

6. An image forming apparatus according to claim 1, wherein the first communication-related information includes communication information on communication received from the communication device by the first communication interface.

7. An image forming apparatus according to claim 6, wherein the setting condition is that the first communication interface has received the communication information from the communication device.

8. An image forming apparatus according to claim 1, wherein the first communication interface performs communication with the communication device in accordance with USB (Universal Serial Bus) standards.

9. An image forming apparatus according to claim 1, further comprising a second communication interface which performs communication with the communication device via a communication network, obtains second communication-related information on the communication and has lower power consumption than the first communication interface, wherein:

the power supply unit further supplies operating power to the second communication interface; and the switching control unit further causes the power control unit to perform the normal mode when the second communication interface obtains the second communication-related information in the sleep mode.

10. An image forming apparatus according to claim 9, wherein the second communication-related information is communication information on communication received from the communication device by the second communication interface.

11. An image forming apparatus according to claim 9, wherein the second communication interface is an Ethernet communication circuit.

* * * * *